(No Model.)

G. HEILES.
COMBINED BUTTON HOOK AND COAT HANGER.

No. 315,500. Patented Apr. 14, 1885.

Witnesses:
A. Schehl.
John M. Speer.

Inventor:
Gustav Heiles
by Brieren & Steele
Attorneys.

UNITED STATES PATENT OFFICE.

GUSTAV HEILES, OF NEW YORK, N. Y.

COMBINED BUTTON-HOOK AND COAT-HANGER.

SPECIFICATION forming part of Letters Patent No. 315,500, dated April 14, 1885.

Application filed February 20, 1885. (No model.)

*To all whom it may concern:*

Be it known that I, GUSTAV HEILES, a resident of New York city, in the county and State of New York, have invented a Combined Button-Hook and Coat-Hanger, of which the following is a full, clear, and exact description, reference being made to the accompanying drawings, in which—

Figure 1:
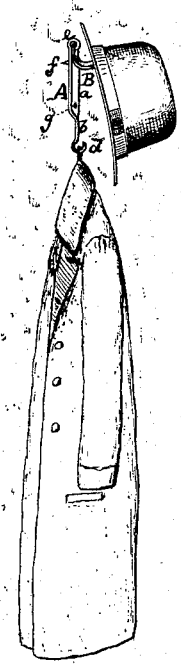
Figure 2:
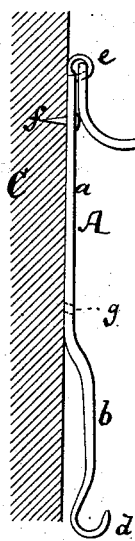
Figure 3:
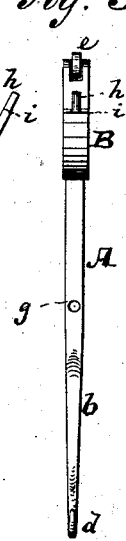

Figure 1 is a perspective view of my combined button-hook and coat-hanger. Fig. 2 is a side view of the same, showing it in position as a coat-hanger and hat-support. Fig. 3 is an edge view of the same; and Fig. 4, a side view of the same, showing it in condition for use as a button-hook.

This invention relates to a new implement which can be used as a button-hook, and also as a means of suspending a coat and hat; and it consists in the new combination of parts hereinafter specified.

Figure 4:
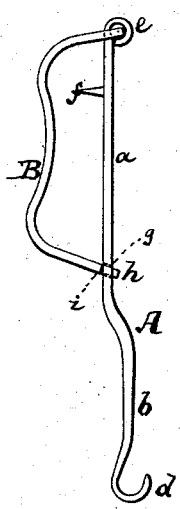

In the drawings, the letter A represents a rod made of metal, Figs. 2, 3, and 4 showing it in about full size for actual use. This rod has an upper straight portion, $a$, and a lower bent portion, $b$. The extremity of this lower bent portion has a hook, $d$, formed upon it. The straight upper portion has at its extremity an eye, $e$, to which is hinged a bent rod, B. Somewhat below the eye $e$ the straight portion $a$ of the rod A has a projecting prong or prongs, $f$. It will be seen by reference to Fig. 2 that the prong $f$ projects from the rod $a$ in a direction opposite to that from which the hook $d$ projects. Below the prong $f$ the rod A has an aperture, $g$. Through this aperture can be passed the free end $h$ of the bent rod B, as in Fig. 4, in which case the bent rod B forms a loop on the rod A, into which loop the prong $f$ projects. A shoulder, $i$, on the rod B determines the extent to which its end $h$ passes through the rod A.

In the position of parts represented in Fig. 4 the implement constitutes a button-hook, and may in this position be conveniently carried in a pocket without danger of the prong $f$ tearing the same. The bent part B forms a loop-handle for the convenient use of the implement as a button-hook. The length of the bent rod B is such that when its end $h$ is inserted through the hole $g$ the rod B will be sprung—that is, slightly elongated—so as to retain its double connection with the part A by this spring action.

When the implement is to be used as a coat and hat supporter, the bent rod B is swung over to the opposite side of the rod A, so as to lean against said rod in manner shown in Fig. 2, and the prong $f$ is then pressed into the post or wall C until the straight portion $a$ of the rod A lies flush against the said post or wall, it being understood, of course, that the curved part $b$ should be vertically below the straight part $a$. A coat can now readily be suspended from the hook $d$, its weight assisting in holding the implement in position on the post or wall, because the coat hanging on the curved portion $d$ of the implement will tend to crowd the straight portion $a$ firmly against the post or wall, and to thereby retain the prong $f$ in the latter.

A hat may conveniently be suspended from the outwardly-projecting bent rod B.

Fig. 1 shows the implement in use as a coat and hat supporter.

I claim—

The rod A, having hook $d$ at one end, loop $e$ at the other end, projecting prong $f$, and aperture $g$, in combination with the bent rod B, which is hinged to the rod A by the loop $e$, the whole constituting a button-hook, coat and hat support, substantially as herein shown and described.

GUSTAV HEILES.

Witnesses:
CHARLES G. M. THOMAS,
HARRY M. TURK.